(12) United States Patent
Twers

(10) Patent No.: US 8,376,382 B2
(45) Date of Patent: Feb. 19, 2013

(54) VEHICLE SUSPENSION LINKAGE

(76) Inventor: Eric Raymond Twers, Vanier (CA)

( * ) Notice: Subject to any disclaimer, the term of this patent is extended or adjusted under 35 U.S.C. 154(b) by 27 days.

(21) Appl. No.: 13/068,114

(22) Filed: May 4, 2011

(65) Prior Publication Data

US 2011/0272909 A1   Nov. 10, 2011

(30) Foreign Application Priority Data

Jun. 8, 2010 (CA) .................................... 2706678

(51) Int. Cl.
*B62K 3/00* (2006.01)
(52) U.S. Cl. .................. 280/283; 280/281.1; 280/288
(58) Field of Classification Search ........... 280/124.128, 280/281.1, 288, 283, 284, 285
See application file for complete search history.

(56) References Cited

U.S. PATENT DOCUMENTS

| | | | | |
|---|---|---|---|---|
| 7,059,620 B2* | 6/2006 | Chamberlain et al. | ........ | 280/284 |
| 7,722,062 B2* | 5/2010 | Dreher, Jr. | ................. | 280/124.1 |
| 7,891,688 B2* | 2/2011 | Chamberlain | ............. | 280/281.1 |
| 7,980,579 B2* | 7/2011 | Buckley | ........................ | 280/284 |

\* cited by examiner

*Primary Examiner* — Eric Culbreth

(57) ABSTRACT

A suspension linkage that produces a rearward arcing wheel path, comprising of either single or paired pivotally connected members. Cross linked trailing arm members attach pivotally to the frame and a rearmost vertical contact mounting point member with the mounting point for the rear wheel axle, ski or skid protruding below the cross linked trailing arms. This offers benefit for vehicle navigating rough terrain at high speed. The present invention provides a suspension linkage that produces a more rearward arcing wheel path than could be produced by a single pivot placed within the same physical bounds as the pivot points of the invention and introduces desirable ride effects related to accelerating and braking.

3 Claims, 17 Drawing Sheets

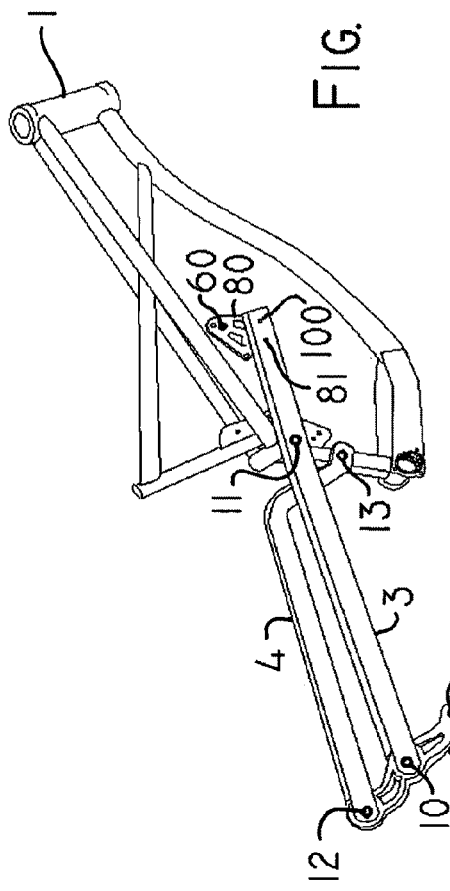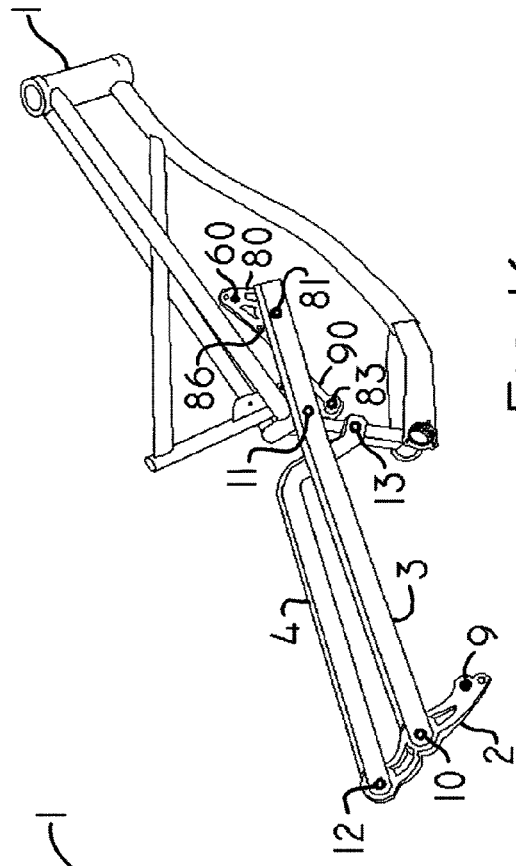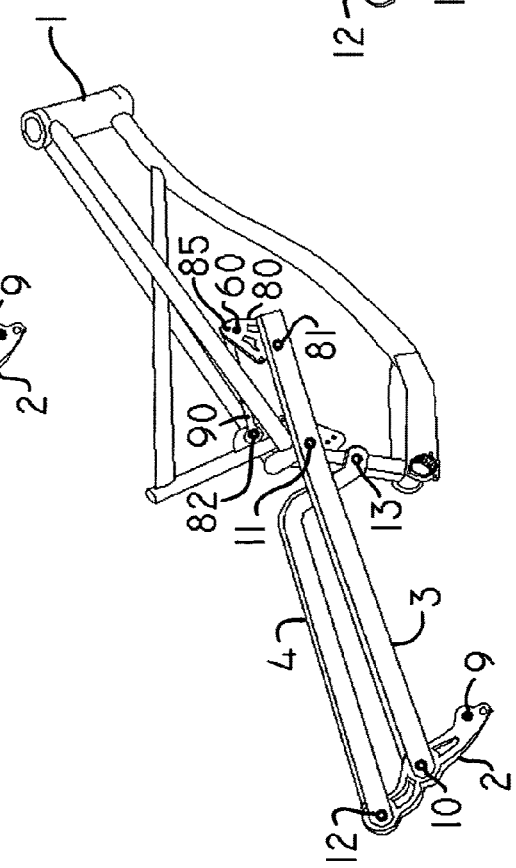

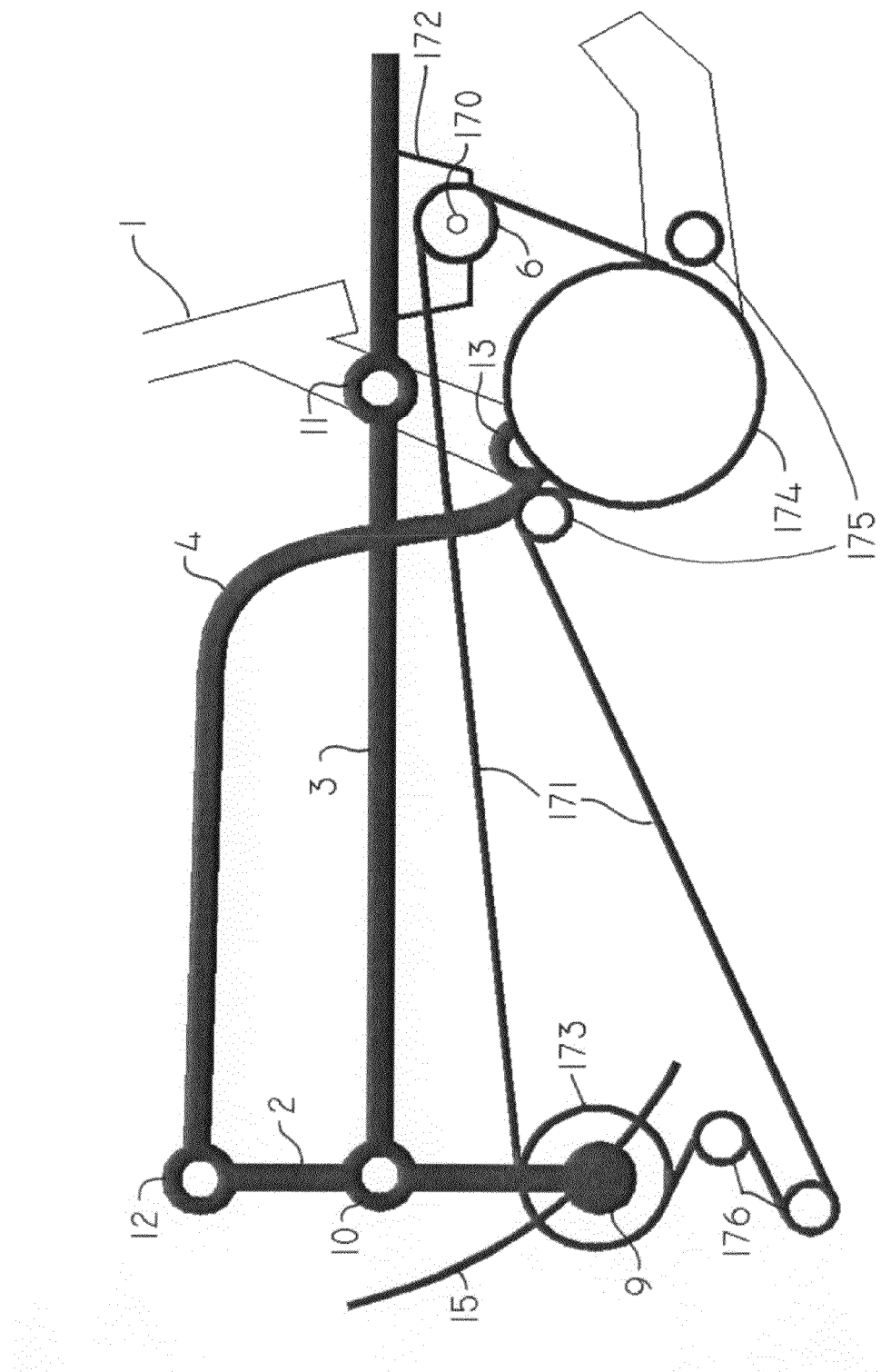

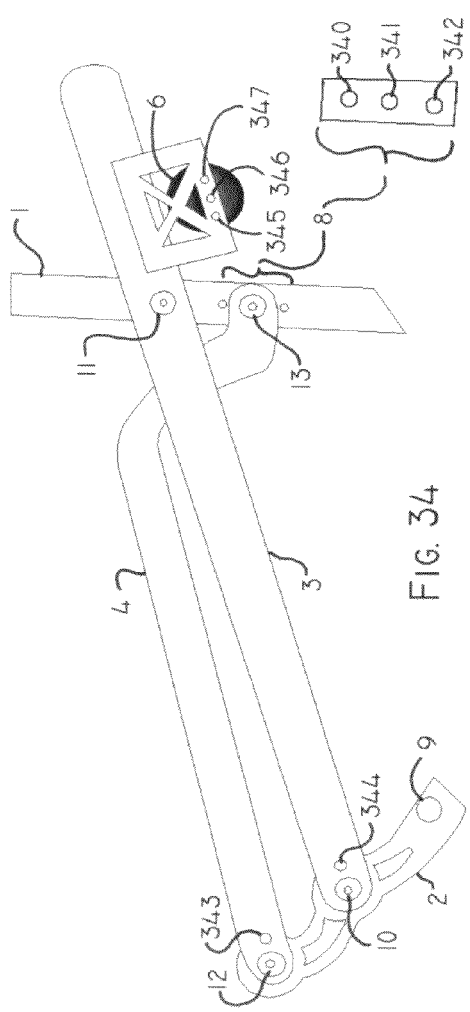
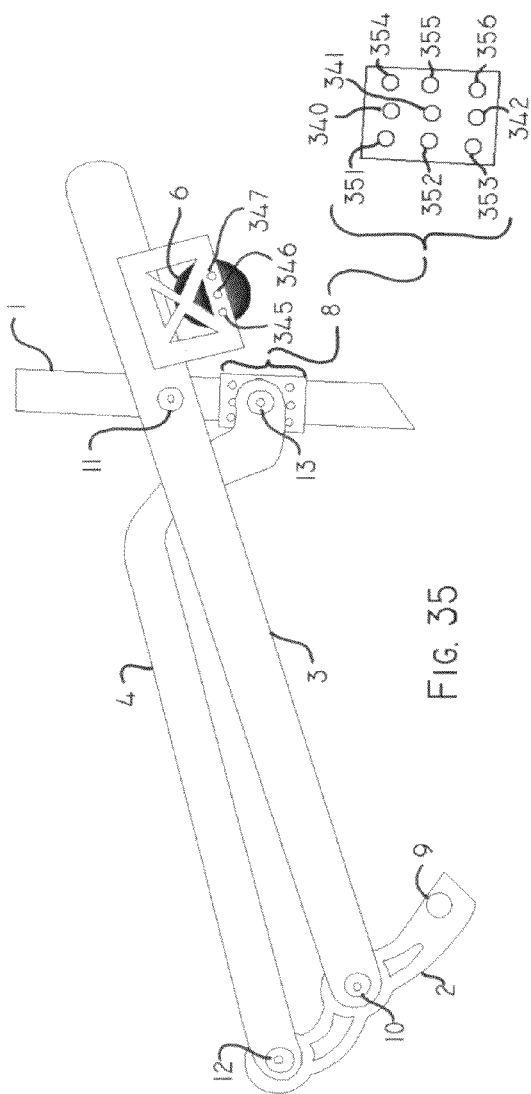

VEHICLE SUSPENSION LINKAGE

This application is filed in conjunction with Canadian patent application 2,706,678 filed Jun. 8, 2010.

BACKGROUND OF THE INVENTION

While much has been done in the prior art to produce a fully suspended bicycle with attention given to isolating pedaling or braking forces from the suspension, the study of wheel path would appear to be focused on isolating these forces. For many implementations of the fully suspended bicycle, pedaling efficiency is of utmost concern. For what is known as a down hill mountain bicycle, or DH Bike, maintaining speed and control over extreme irregularities in the running surface is often the primary concern.

A DH Bike is almost always ridden in a standing position using gravity as the primary force for acceleration. Pedaling becomes a secondary method of maintaining the bicycle's velocity over rough terrain or to add additional acceleration when the terrain is not steep enough.

After several years of studying the prior art as a rider and technician, I find that the best suspension for a DH Bike is different than much of the prior art, not in pedaling or braking effects, but in terms of wheel path. This invention produces a wheel path that I consider most desirable in a way that corrects design issues of the few examples of the prior art that produce a similar wheel path.

When the prior art is arranged as shown in FIG. 2 through strictly symbolic representation we see that the top most row represents the wheel paths of the single pivot suspension: a low single pivot (21), a mid height pivot (22), a high single pivot (18) and a very high single pivot demonstrated by U.S. Pat. No. 606,323 June 1898 Wronski (23). The wheel paths of linkages are demonstrated in the second row as U.S. Pat. No. 5,121,937 June 1992 Lawwill (24), U.S. Pat. No. 5,509,679 April 1996 Horst Leitner (25), U.S. Pat. No. 7,128,329 Weagle (26) and U.S. Pat. No. 4,671,525 June 1987 Ribi (27). The third row represents Canadian Patent application #2357167 September 2001 Duval (26), U.S. Pat. No. 6,206, 397 March 2001 Klassen et al (29), a superposition of the wheel paths demonstrated above from a common starting point (20) to their respective end points and in the lower right hand corner, this invention.

The wheel path of a low single pivot (21) arcs forward. A mid height single pivot (22) and Duval (28) ultimately move forward of their starting point, while Lawwill (24), Weagle (26) and Leitner (25), in ideal implementations, maintain a near vertical wheel path. It isn't until we see the ideal representation of the Klassen et al (29) wheel path that a slightly rearward path becomes apparent. The high single pivot (18) shows a much more dramatically rearward arcing path. The very high single pivot of Wronski (23) and the linkage system of Ribi (27) manage to produce a sufficiently similar and dramatically rearward arcing wheel path that they are shown on the same line as the representative wheel path of this invention (15).

The reason for pursuing this wheel path involves a short discussion on vector physics. As the rear wheel of a vehicle such as a bicycle encounters a positive variation in the running surface such as a bump or other obstacle at low speeds the impulse vector has a substantial vertical upward component and less of a horizontal rearward component. As speed increases the rearward component of the impulse vector increases. The path for the wheel or contact mounting point to travel to best absorb this impulse vector is in an increasingly rearward direction. Suspension does not only allow for the absorption of positive variations in the running surface, it also allows the vehicle to maintain an "in contact" condition through allowing the wheel to move downward from a typical running "sag" point to maintain contact with the running surface in the case of a dip or depression. Having a contact mounting point move in a forward direction when the suspension extends from its sag point allows for a faster return to a "in contact" condition given the forward direction of the vehicle.

The inventions of Wronski and Ribi both produce a similar wheel path but introduce certain design issues. Wronski requires a very high mounting point of the vehicle's frame to produce a dramatically rearward arcing path and the use of a concentrically mounted jackshaft to route the drive chain to the pivot to avoid issues of changing the tension on the drive chain during suspension activation. Ribi introduces linkages low on the vehicle frame, and in the case of U.S. Pat. No. 5,452,910 September 1995 Harris, a bicycle specific invention that produces this rearward wheel path, we find that not only are the pivots low on the frame of the vehicle, the cranks move with the suspension and change their distance from the handle bars and, less importantly for the purposes of a DH bike, from the saddle of the bicycle.

With the wheel path as the primary focus of this invention the issues of pedaling and braking effects must be addressed to ensure that additional problems are not introduced.

The traditionally held negative effect of pedaling on a fully suspended bicycle is known as pedal bob. This is often attributed to rotational forces about the rear wheel or to drive chain tension activating the suspension independently of any need to absorb irregularities in the running surface. Activation of the suspension from pedaling can also be observed to be induced by the unbalanced momentum of a downward pedal stroke. While an ideal pedal stroke would provide smooth power to the drive train throughout the entire crank rotation this is not necessarily possible or practical from a standing position and in situations where surface irregularities make a smooth pedal stroke difficult from clearance issues alone.

The traditionally held view of braking effects on a vehicle's suspension, where that vehicle is a bicycle, discuss issues of rotational forces and an unbalanced pull on the frame from the location of pivots. While this is often studied from the perspective of the vehicle alone, it should be noted that a typical rider weighs 75kg (165lb) and a typical DH Bike weighs 18kg (40lb). The mass of the rider must be added to the calculations of vehicle momentum and the resultant centre of gravity must be seen as that of the rider and vehicle. Considering that a standing riding position is typical for a DH bike, the centre of gravity of the bicycle and rider combined is thus above that of the vehicle; under braking, momentum causes a pitching forward of the bicycle and rider combination.

Additional ride performance characteristics are desirable for a DH bicycle. A bike with a short wheelbase, specifically the distance from the cranks to the rear axle is desirable for manoeuvrability in the air and to allow easier lifting of the front wheel over obstacles while pedaling. A vehicle that extends its wheelbase, again specifically when measured from cranks to rear axle, offers more stability on compression. A bike that will lower in the rear suspension on braking to counteract the previously discussed issue of a pitching forward of the rider and vehicle combination and thus developing a slacker head tube angle would serve to add stability in a braking scenario where bias was given to the rear brake. A bike that will rise or at the very least serve to counteract the unbalanced downward force of an abrupt pedal stroke to preserve or increase ground clearance during pedaling can be seen to be advantageous for both ground clearance and traction.

The prior art has not necessarily sought to accomplish the above ride characteristics while producing this rearward wheel path; however this invention serves that purpose as seen as beneficial to the implementation of a DH bike.

BRIEF SUMMARY OF THE INVENTION

The present invention provides a suspension linkage that produces a more rearward arcing wheel path than could be produced by a single pivot placed within the same physical bounds as the pivot points of the invention and introduces desirable ride effects related to pedaling and braking.

The invention, as implemented in the embodiment of a bicycle, comprises a pair of rear most members extending up and slightly rearward away from the mounting point of the rear axle. These rearmost members will be pivotally connected, using a pair of trailing arm members, at a point near mid way along their vertical length to a pivot point on the bicycle's frame near mid height. The rear most members will also be pivotally connected at their upper limit to a pair of trailing arm members that connect to a pivot location on the frame below the first frame mounted pivot creating a crossing of the two pairs of trailing arm members as viewed from the side. The axle mounting point being below the pivots creates a protrusion below the cross-linked trailing arm members. Both the requirements of cross linked trailing arm members and the protrusion below the trailing arm members are distinguishing and required characteristics of this invention.

This linkage configuration produces the rearward arcing wheel path sought to handle running surface variations at high speeds.

Using FIG. 3 as a reference, a thick line drawing representation of the rearmost member (2), pivotally connected (10) to a trailing arm member (3) itself pivotally connected (11) to the mid point of the vehicle's frame (not shown in this sketch) and also pivotally connected (12) to the second and cross-linked trailing arm member (4) likewise pivotally connected (13) to the vehicle's frame, the path scribed by the axle mounting point (9) protruding below the crossed trailing arm members is shown as the curved line (30). When examining the path scribed by the axle over the range of motion intended for use in the preferred embodiment, as shown by the thick line (15), the path appears to be an arc with a fixed centre at a point (19) above the linkage members. While this approximation of a single pivot suspension operating between the bounds of the dotted lines (35) is acceptable for a general understanding of the effect of the invention through the portion of the path we can see from the bisection of the curve (30) scribed by the axle (9) at regular intervals we demonstrate a shape similar to, if not exactly, that of a logarithmic spiral. The path (30) can be more accurately approximated as a spiral formed from a lengthening radius moving about an also moving pivot point that follows its own logarithmic spiral style path as shown by the composite simulation of an arc (34). This approximation would become more accurate on increasing the frequency with which the path (30) is bisected.

The invention serves the desired purpose best when the range of motion is limited to the path shown by the thicker line (15). Continuing past the intended range of motion above the shown end point (32), the wheel path loses it's rearward arc as the axle (9) becomes level with the approximation (19) of the location of a virtual single pivot. While the rearward component of the wheel path stops and in fact reverses not far after this end point (32) the approximation of a single pivot suspension continues to have the radius or length of the virtual swing arm continues to increase up until the angle formed between the protrusion the rear most member (2) and the first cross-linked trailing arm member reaches 180°. At this point the lengthening effect collapses. Care must also be taken to configure the lower end point of the wheel path to be above the point at which the path (30) becomes horizontal. Continuing past the intended range of motion below the start point (31) with a configuration where the axle path was in the range of horizontal to becoming vertical again (33) would place the vehicle at rest, without sag in a potential energy well, thus preventing suspension activation unless a very forceful rearward impact was experienced. While this situation could produce an effectively rigid system until subjected to an extreme rearward force, for the purposes of a DH bike this is not desirable. This potential energy well may be explored for systems where this rigid in most circumstances condition would be desirable.

As a point of interest, the wheel path of this invention is also similar to that of the path scribed by the payload of a trebuchet before launch. This path has shown to be an efficient means of imparting acceleration to a mass, it also shares an intuitively obvious efficiency in absorbing force.

To temporarily store and dampen the rate of return of the energy absorbed by the suspension linkage a shock absorber and spring unit, consisting of a pneumatic cylinder, elastomer or coil spring combined with a hydraulic or spring property (in the case of an elastomer) based energy damping mechanism will link one or more of the suspension linkages to the frame either directly, through additional linkages or between two of the suspension members. Attaching a shock absorber and spring unit can produce any of linear, rising or falling rates. Since there are benefits and desirable characteristics in each of rising, linear and falling rates as applied to suspension, depending on the ride characteristic sought, selection of shock absorber and spring units may be configured to offer each of these options.

A pulley mounted to a suspension linkage member in a position such that it will become closer to the drive crank on suspension activation will serve to compensate for the fact that the desired wheel path creates a scenario where the drive chain, otherwise attached, may create undesirable tension induced suspension activation and may transmit suspension activation forces back to the cranks and thus pedals of a chain driven bicycle. The use of such a pulley or drive train mounting point allows the length of the tension portion of a drive chain to remain effectively constant thus preventing appreciable suspension activation or pedal feedback.

With the tension of the drive chain negated, we can look to beneficial ride effects of driving the rear wheel. Under acceleration, the rear wheel will be driven forward thus serving to extend the suspension and raise the vehicle. Under smooth application of power this will serve to increase ground clearance under pedaling, shorten the wheelbase allowing for easier lifting of the front wheel and allow unbalanced downward forces of uneven pedal strokes to be counteracted by the reciprocal raising of the vehicle's frame under uneven power application.

Directly attaching a rear disc brake calliper to the rearmost member near the axle can be expected to induce suspension activation through transmission of rotational inertia. Connecting a rear disc brake calliper to a mechanism pivotally connected about or near the rear axle allows for the isolation of rotational force from the suspension if this pivotally connected mount is linked to a suspension member or the frame. This allows the primary force experienced under rear braking to be that of an extension of the wheelbase due to the rearward component of the wheel path vector being in line with the force of braking.

The invention is configurable through manipulation of the length of the suspension members and the relative position of the pivots. FIGS. 22 though 26 show the effects of changes to the configuration showing the vehicle frame (1) as a solid block. Using FIG. 22 as a baseline the wheel path is shown as the familiar rearward arcing line (15). FIG. 23 mounts the proximal pivots (11 & 13) lower on the frame (1) keeping the ratios of separation between distal pivots (10 & 12) and proximal pivots (11 &13) the same. The effect is shown as a much less rearward arcing path (230) diminishing the invention's effectiveness for all but cases where a vehicle required this path and an extremely low mounting point on the frame. FIG. 24 shows the same ratio of pivot separation but a higher mounting point on the frame (1). This generates a much more rearward wheel path (240). With this increased rearward path comes a greater likelihood of configuring the suspension to fall within the previously discussed potential energy well. Continuing with the different configuration options, FIG. 25 demonstrated an increase in the ratio of proximal pivot (11 &13) separation to distal pivot (10 & 12) separation. This produces a yet again more rearward path (250). As compared to FIG. 25, FIG. 26 shows an increase in the length of the protrusion of the rearmost member (2) below the cross-linked trailing arm members (3 & 4). This serves yet again to increase the effect of the invention on wheel path (260), all the while requiring careful attention to avoiding the potential energy well as seen to be nearly unavoidable in this extreme configuration.

To continue with the discussion of the general principles of configuring the invention FIGS. 27 through 32 demonstrate physical structure considerations in terms of optimization. Relative to the initial baseline sketch of FIG. 22, FIG. 27 demonstrates a configuration with the same ratios of proximal (11 &13) and distal (10 &12) pivot separation but a larger structure. This produces our familiar wheel path (15). This larger structure can be imagined to give increased strength and lateral rigidity at the cost of physical space requirements. FIG. 28 shows a smaller structure using the same ratios, producing, as expected, the same path (15) as our baseline FIG. 22. Here though we see the sacrifice of structure strength and lateral rigidity with the benefit of a smaller spatial requirement. FIGS. 29 and 30 show direct comparisons of increased proximal to distal pivot separation. In the case of FIG. 29 and the increased effect on the wheel path (290) while FIG. 30 shows the decreased effect of a decreased proximal (11 &13) to distal (10 & 12) pivot separation on the wheel path (300). FIG. 31 shows, independently of other factors, the effect of the an increased protrusion of the rearmost member (2) below the midpoint pivot (10), thus increasing the relative length of the protrusion to the trailing am members (3 & 4). This shows an increased effect on the wheel path (310). FIG. 32 can be seen to demonstrate the reciprocal effect to that shown in FIG. 31. With a shorter protrusion the effect on the wheel path (320) is reduced. While the effect is minimized it is good to note the increase in strength and stiffness shown by the configuration in FIG. 32.

As a last aspect to the general principles of configuration and optimization of the invention, FIG. 33 shows the suspension in three states of activation as load is applied to the frame (1) with the wheel (14) resting on the running surface (16). The angle formed between the rearmost suspension member (2) and the mid point mounted trailing arm member (3) is optimized at or near 90° when the vehicle is at sag (330). This allows for a most possible rapid shortening of the wheelbase away from sag by initiating the acute angle shown on the left (331) on extension while also maintaining a maximum load bearing condition under sag as well as allowing the obtuse angle (332) form under full compression to remain less than 180°.

A summary of ride effects is as follows. The wheel path is an up and rearward arcing path to most efficiently dismiss impulses from positive variations in the running surface while, as seen from the sag point the path moves forward to return to an in contact position more quickly than other wheel paths allow. The elongation on full compression offers increased stability when required while the shortening in non-contact situations allows for easier manoeuvrability in the air. Braking may have rotational effects handled through a floating brake mount while suspension elongation effects of biased rear braking will serve to lower the frame thus not only opposing the forward momentum of the rider's centre of gravity but also slackening the head tube angle of the vehicle effectively producing a more stable platform in a panic situation. While the pulley feature handles chain tension issues, smooth acceleration forces will serve to increase ground clearance and increase the steepness of the head tube angle thus improving manoeuvrability. Downward forces generated by poor pedaling technique or when no other option is available are opposed by the raising of the vehicle as discussed. While much of the prior art has been intended to eliminate all feed back between rider and suspension, this invention, while primarily focused on the desired wheel path also serves to enhance the desirable effects of a high single pivot suspension as configured with a tension-compensating pulley and floating brake mechanism.

In light of the above, direct discussion of the difference between this invention and the one demonstrated in Canadian Patent Application #2357167 September 2001 Duval can be served by examining FIG. 36. The differences between this invention and the prior art cited may be considered obvious from FIG. 2, however Duval shows cross-linked members. The present invention contains two definitive and crucial aspects, cross-linked members and a protrusion of the axle mounting point below the cross-linked members. Optimization of the present invention concluded that on absence of either of these features the effect is nullified. More subtly, optimization requires that the angle formed between the protrusion and the mid linked trailing member, while optimized at 90° at sag must at all times remain less than 180°. Duval's cross linked trailing arm members are not only intended for a different purpose, the rear triangle formed, possibly likened to the protrusion of the present invention, is quite clearly at or greater than 180°. The effect of this is most apparent in the comparison of the present invention's wheel path (15) and Duval's wheel path (360). For simplicity and approximation, FIG. 2 grouped Duval with Leitner and Lawwill while in fact there may be (given configuration subtleties) a more forward path presented by Duval than either of the likened inventions. FIG. 36 continues to show that a downward force (361) from a sloppy pedal stroke is counter opposed by the raising action (363) of the forward movement (362) of the present invention's wheel path (15) under acceleration forces while forward movement (362) is effectively blocked, as intended, by Duval's configuration of this force being near perpendicular to the wheel path (360) without opposing the downward force that may be applied. Similarly the purpose of the cross-linked members in Duval is to serve to isolate braking forces (365) from the suspension, rearward forces isolated by being primarily perpendicular to the wheel path (24) and rotational forces blocked by the alignment of the cross-linked members, while not being targeted towards opposing the forward momentum of the rider (364). In the present invention the rearward braking forces (365) have a vector component along the wheel path (15) thus activating the suspension and applying a lowering force (366) to oppose the forward momentum of the rider and bike combination (364) at a centre of gravity above the vehicle.

BRIEF DESCRIPTION OF THE SEVERAL VIEWS OF THE DRAWINGS

FIG. 14 allows for the explicit demonstration of the inherent falling rate of the invention.

FIG. 15 demonstrates the effectiveness of a falling rate enhancement configuration FIG. 16 allows for a visual comparison of the ratios involved in producing a rising rate linkage.

FIG. 17 shows the routing of a drive chain over a tension compensation pulley serving to isolate the invention from drive tension.

FIG. 34 illustrates configuration options for wheelbase, magnitude of effect and tension compensation pulley mounting.

FIG. 35 illustrates a combined wheelbase and magnitude of effect configuration option.

DETAILED DESCRIPTION OF THE INVENTION

Figure 1:
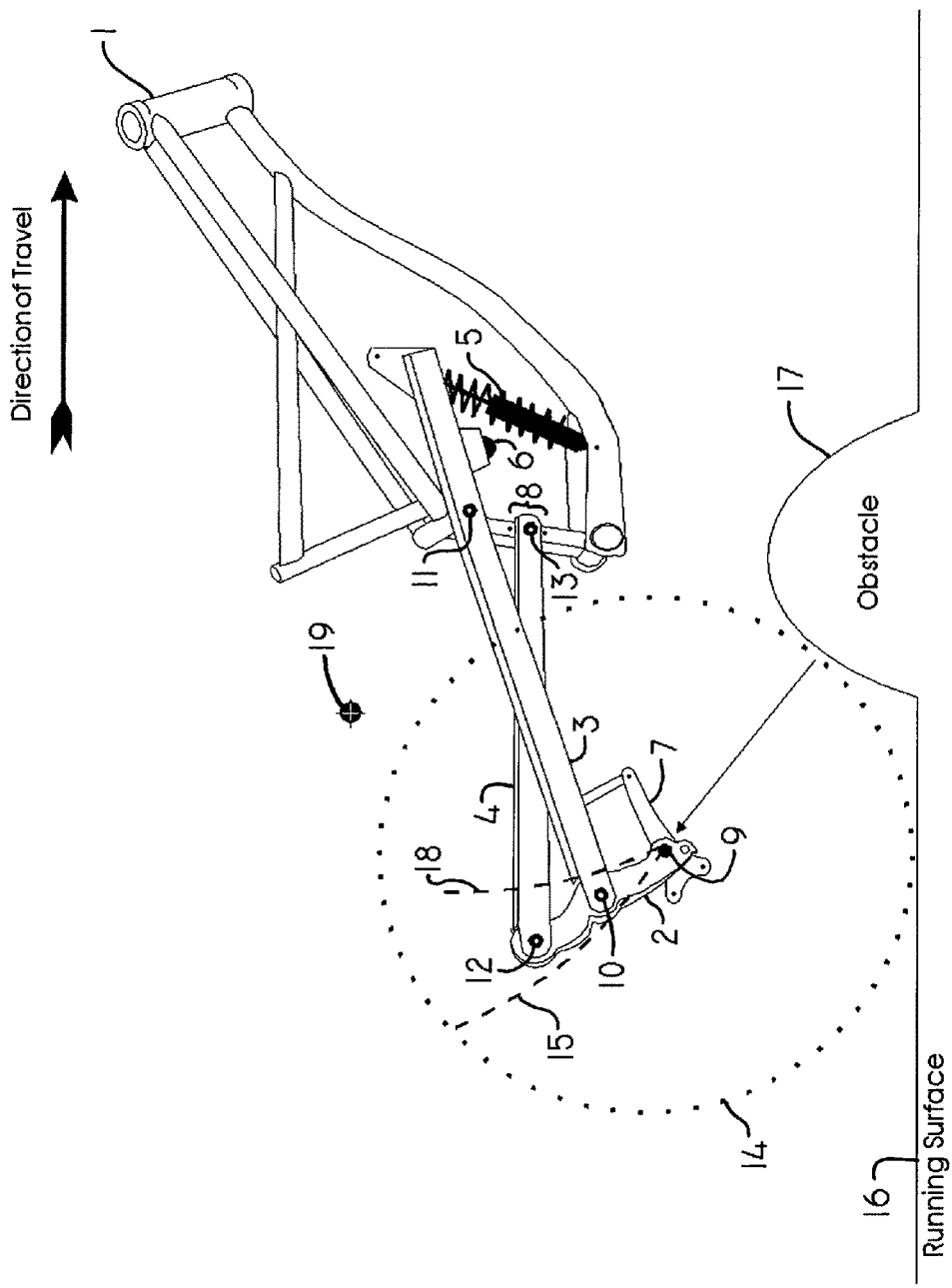
FIG. 1 is an isometric view of the invention and its key components.
Figure 2:
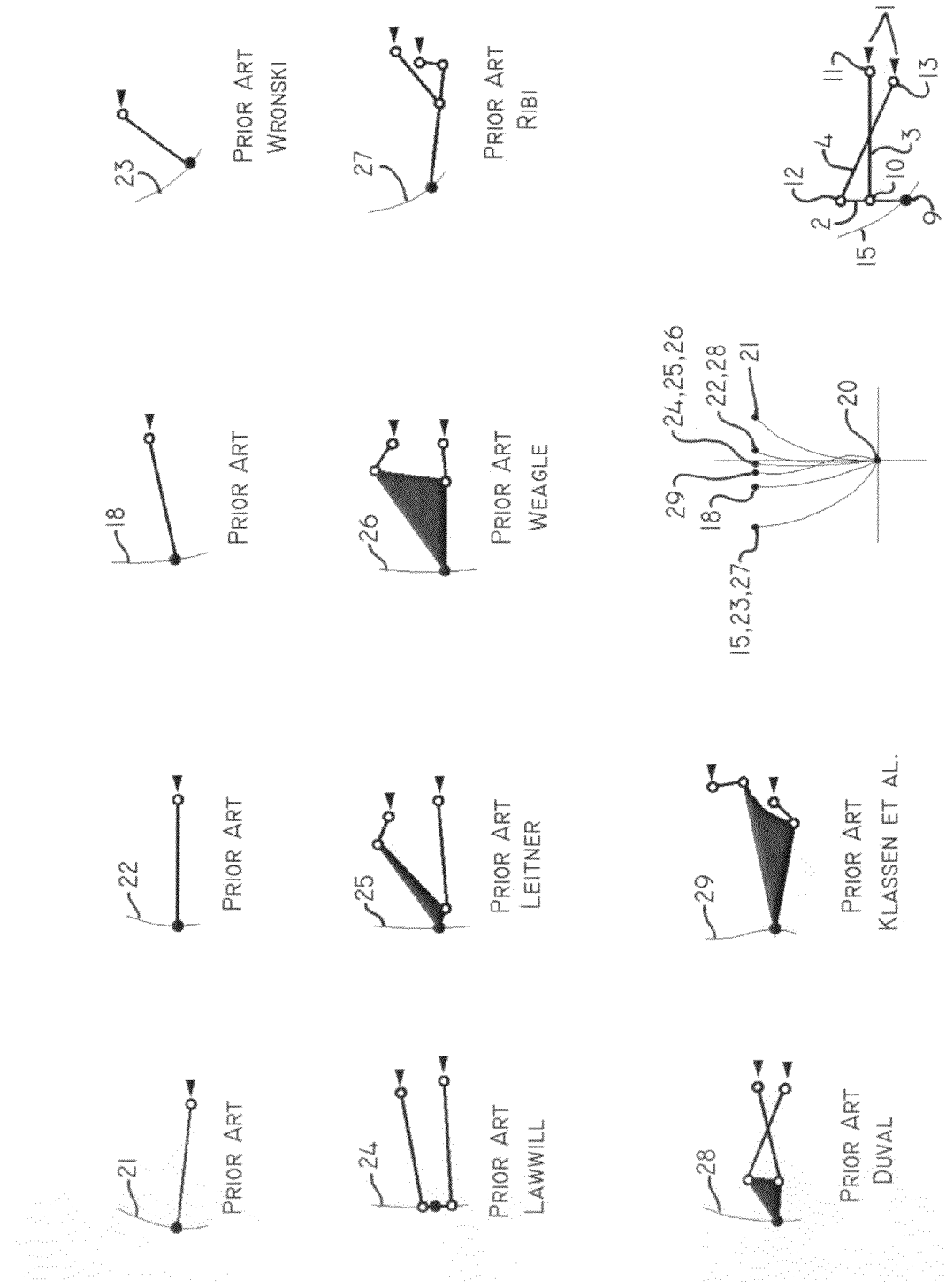
FIG. 2 is a line drawing representation of examples of the prior art as compared to the invention
Figure 3:
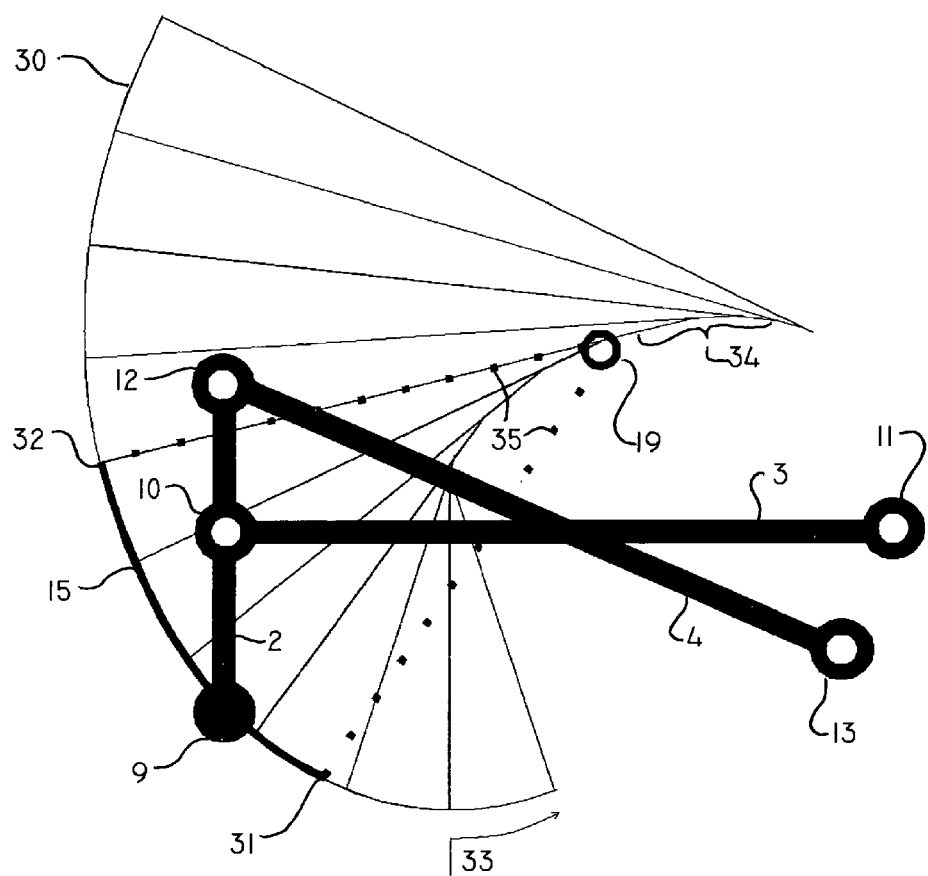
FIG. 3 is a representation of the specific path scribed by the invention
Figure 37:
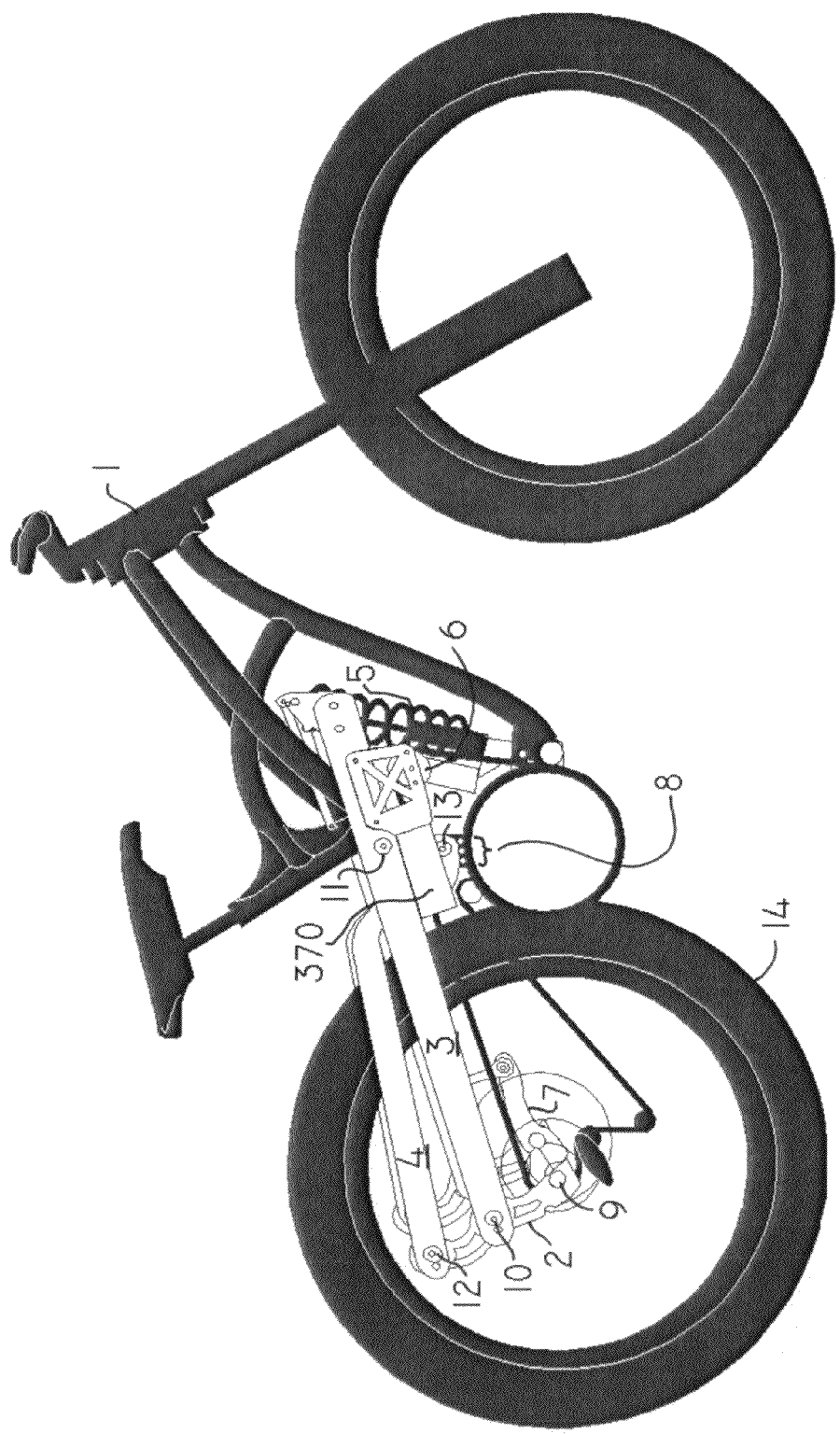
FIG. 37 illustrates the intended prototype DH Bike implementation of this invention.

Referring to FIGS. 1 & 37, I have used the illustration of a bicycle comprising a frame 1 and a rear suspension linkage system comprising a rearmost vertical and slightly rearward member 2 pivotally connected near its mid point 10 to a trailing arm member 3 also pivotally connected 11 near the vertical mid-point of the frame 1, this rearmost member 2 also pivotally connected at its uppermost point 12 to another trailing arm member 4 that crosses the first trailing arm member 3 and pivotally attaches to the frame 1 at a point 13 on the vehicle's frame 1 below the mid point mounted member 3. The rear wheel 14 is attached to the protrusion of the rearmost member 2 at a point 9 below the cross-linked trailing arm members 3 & 4. A spring and shock absorber unit 5 is connected to store and return absorbed energy in a damped fashion. A tension compensation pulley 6 is present to isolate chain tension forces from the suspension. A brake mechanism 7 is pivotally connected about the axle 9 to isolate rotational force of braking from the suspension. The cross-linked proximal pivot 13 is attached in a variable location 8 to allow for configuration of the effect of the invention. This produces a wheel path 15 similar to a suspension pivoting about point 19. The wheel path 18 of a single pivot suspension pivoting about point 11 is shown for comparison.

Figure 4:
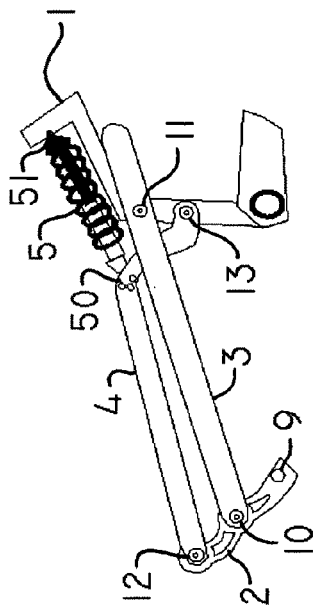
FIG. 4 is a side view of attaching a shock absorber and spring unit directly to one trailing arm member
Figure 5:
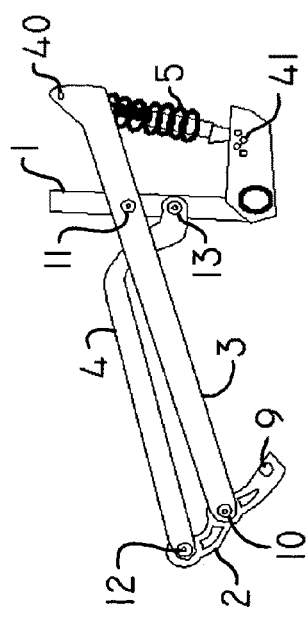
FIG. 5 is a side view showing an alternate trailing arm member attachment point for the shock absorber and spring unit.
Figure 6:
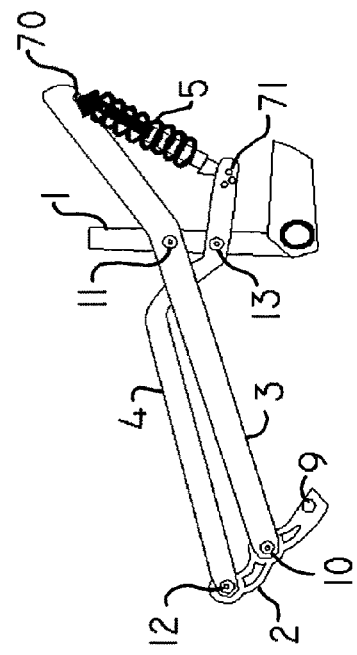
FIG. 6 is a side view of attaching a shock spring unit through an arbitrary linkage
Figure 7:
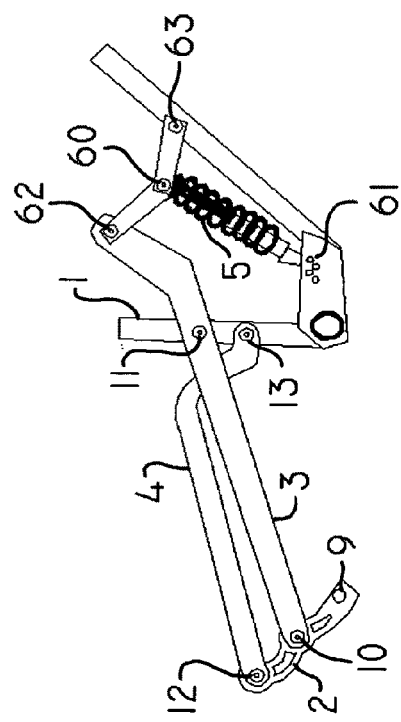
FIG. 7 is a side view of attaching a shock absorber and spring unit between the two trailing arm members.

In FIGS. 4 through 7 we see examples of possible ways to connect the shock absorber and spring unit 5. A direct connection between a point 40 on an extension of a trailing arm 3 and a point 41 on the vehicle's frame 1 is demonstrated in FIG. 4. In FIG. 5 we see an example of a connection at a point 50 on a different trailing arm member 4 and a point 51 on the vehicle frame 1. A linkage based connection is shown in FIG. 6 in which the shock unit 5 is connected at a point 60 on a linkage pivotally connected 62 to a trailing arm member 3 and also pivotally connected 63 to the frame 1, driving the shock 5 towards the frame 1 mounted connection point 61. In FIG. 7 we see the option of connecting the shock 5 between a mounting point 70 on the extension of one trailing arm 3 and at a mounting point 71 on an extension of the other trailing arm member 4. These options all demonstrate different possibilities with inherent advantages for mounting the shock absorber and spring unit.

Figure 8:
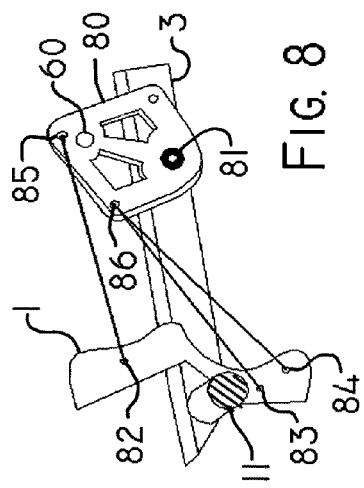
FIG. 8 is a cut away drawing showing the linkage points for a possible shock absorber spring unit mounting linkage

In the preferred embodiment many of the advantages of each of the options presented in FIGS. 4 though 7 can be generated by a single but multiply configurable method of attaching the shock absorber as shown in FIG. 8. In this sketch we see a bell crank 80 pivotally mounted 81 to a trailing arm member 3. The shock absorber and spring unit not shown is mounted to a point 60 on the bell crank and to a fixed point not shown on the frame 1. A link would pivotally connect an upper point 85 on the bell crank to the frame at a point 82 forming a rhombus to pull the bell crank towards the trailing arm 3 pivot location 11 thus shortening the distance from the shock mount 60 to the pivot 11 and producing a falling rate linkage. Connection of the lower mounting point 86 on the bell crank 80 to a point 83 on the frame 1 slightly below the pivot 11 produces the recognizable cross-linked member with protrusion in this case upwards of the suspension linkage itself. This mounting position 86-83 can be configured to cancel out exactly the inherent falling rate of the invention as will be discussed later. With the connection at a point on the frame 83 configured to exactly cancel the falling rate of the invention, thus creating a linear rate, using what we now know about configuring the effect of the invention, an increase in the proximal pivot separation can be made by mounting the link at a point 84 further from the pivot 11. This increased proximal pivot separation will increase the effect of this invention and thus produces a rising rate linkage.

Figure 11:
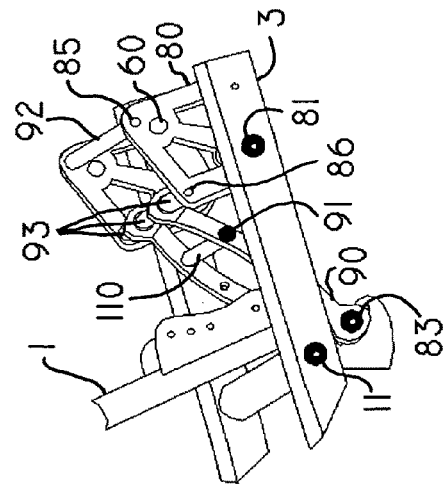
FIG. 11 illustrates the use of the invention itself on a smaller and reciprocal scale to produce a linear or rising rate shock absorber and spring unit mounting linkage.
Figure 10:
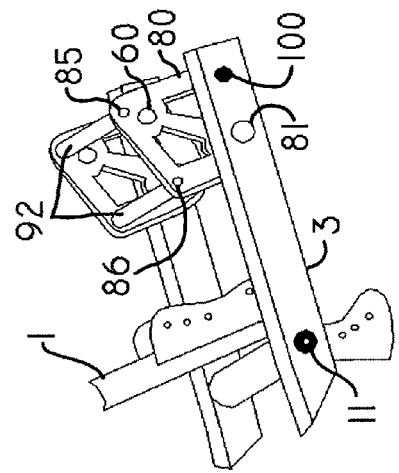
FIG. 10 illustrates a fixed mounting option producing a falling rate inherent to the invention
Figure 9:
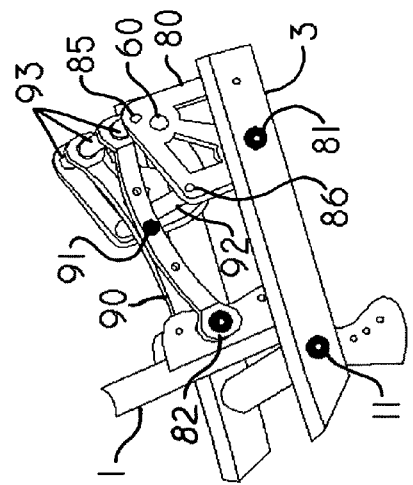
FIG. 9 illustrates the Falling Rate enhancement configuration of the linkage options.

A detailed view of the falling rate enhancement linkage is shown in FIG. 9. The "rate link" 90 is drawn in as two curved pivotally connected links bolted together 91 to increase stiffness and offer clearance of frame components. A stiffening pin 92 mounted at the unused mounting point 86 on the bell crank 80 is shown to add rigidity to the structure. Spacing of the rate links is done through sleeves 93 on the attachment point 85 pin (not seen under the sleeves). An additional configuration is shown in FIG. 10 consisting of simply fixing the bell crank 80 in place to the trailing arm 3 with a bolt 100. This generates a shock absorber spring unit mounting that follows the inherent falling rate of the suspension linkage. The stiffening pins 92 can be added between both upper 85 and lower 86 mounting points on the bell crank 80. Detail of the linear rate linkage is similar in configuration to the rising rate linkage and shown in FIG. 11. The rate link 90 is connected at the lower point 86 on the bell crank 80 and the frame 1 at a cross-linked location 83. The rate links 90 curve outwards from one another in this configuration and are connected with a pin 110 to increase rigidity. A stiffening pin 92 as expected is connected between the unused mounting points 85.

Figure 13:
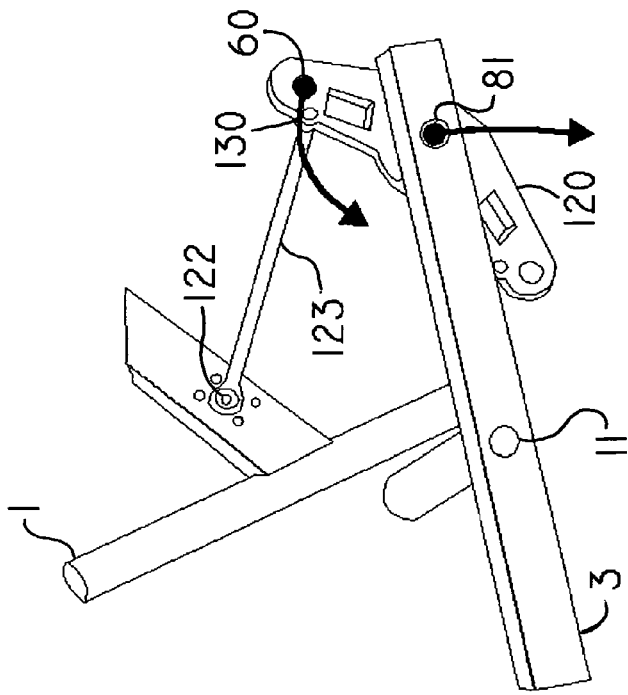
FIG. 13 is the falling rate enhancement option of the alternative linkage.
Figure 12:
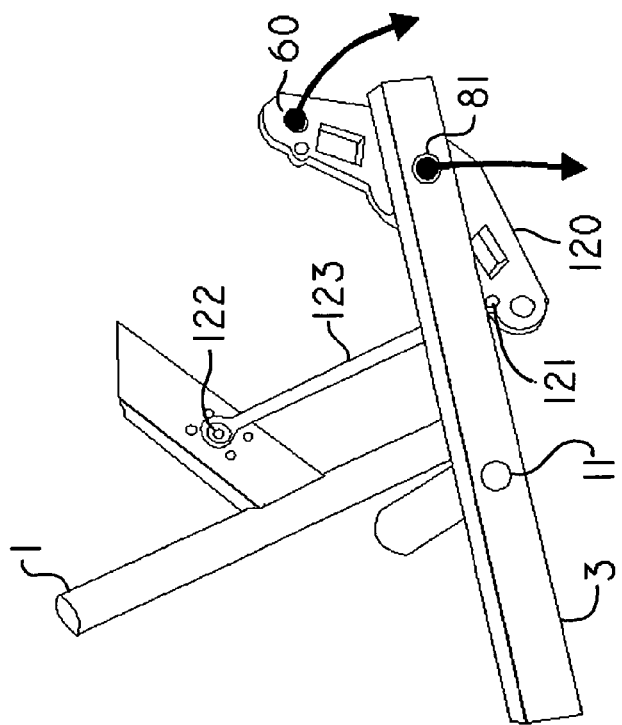
FIG. 12 is a partial view of the rising rate version of an alternate shock absorber and spring unit mounting linkage.

An alternate rate link configuration is shown in FIGS. 12 &13. In FIG. 12 a different bell crank 120 is pivotally connected 121 to a point 122 on the frame 1 with a link 123 to produce a rising rate linkage. In FIG. 13 we see the connection of the link 123 to a point 130 on the bell crank 120 that will enhance the inherent falling rate of the suspension linkage.

A demonstration of the effect and effectiveness of the rate links and the inherent falling rate configuration is demonstrated in FIGS. 14 through 16. FIG. 14 shows a fixed mounting point 60 for the shock on the bell crank 80 fixed to the extension of the trailing member 3 by a bolt 100. Since the distance between the pivot 11 and the mounting point 60 will not change, the fact that the distance between the axle 9 and the pivot 11 increases during activation the suspension demonstrates an inherent falling rate. With FIG. 15 we see the falling rate enhancement configuration which can allow a progressive shock and spring unit such as an "air shock" to perform as a less progressive, or even falling rate. Through this linkage of the bell crank at the upper point 85 to the frame 1 at a point 82 forming a rhombus we see that the distance from the shock mount 60 to the pivot 11 will decrease, this amplifies the inherent falling. The rising rate configuration shown in FIG. 16 can be shown to be effective based on our knowledge of configuration criteria for the invention. Recognizing that this rising rate configuration is a counter opposed implementation of the linkage of the invention itself used to drive the shock, we see that the protrusion of the mounting point 60 above the pivotally connected member 90 is greater than the ratio of the protrusion of the axle mounting point 9 below the trailing arm member 3. This as has been shown, generates an increased effect and thus a rising rate linkage to drive the shock absorber and spring unit.

To isolate drive chain tension from the suspension, FIG. 17 demonstrates the chain path configuration as navigated about a tension compensation pulley 6 mounted at a point 170 attached by a mounting bracket 172 to the forward extension of the trailing arm member 3. The chain 171 passes from the rear sprocket or sprockets 173 over the pulley 6 around the chain ring 174, through a chain guide device 175 and through the derailer or tensioning unit 176. As the suspension activates the pulley 6 gets closer to the chain ring 174 thus shortening the run of chain between the pulley 6 and the chain ring 174. This can be configured through placement of the pulley 6, changing the amount of tension compensation offered over the top or tension portion of the chain 171. Discrepancies in tension over the lower, non-tension portion of the chain can be accommodated for as often is done in the prior art by a pivotally connected derailer or tensioning unit 176. In the discussion on wheel path scribed by the invention we know that the wheel path only simulates a single pivot over the range of intended use by the preferred embodiment, however we find that since tension compensation is most critical between the sag point and the maximum compression a pulley 6 mounted to a singly pivoting suspension member 3 is sufficient to isolate reciprocal forces between the suspension and drive tension.

Figure 18:
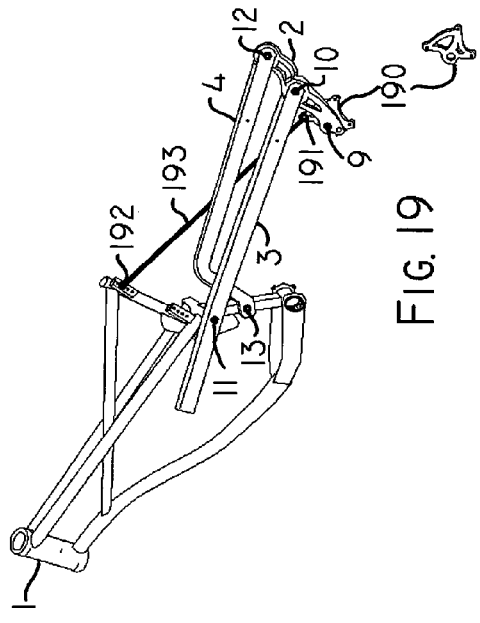
FIG. 18 illustrates a floating brake configuration involving a low mounting point on the brake mount and a cross-linked mount on the frame.
Figure 19:
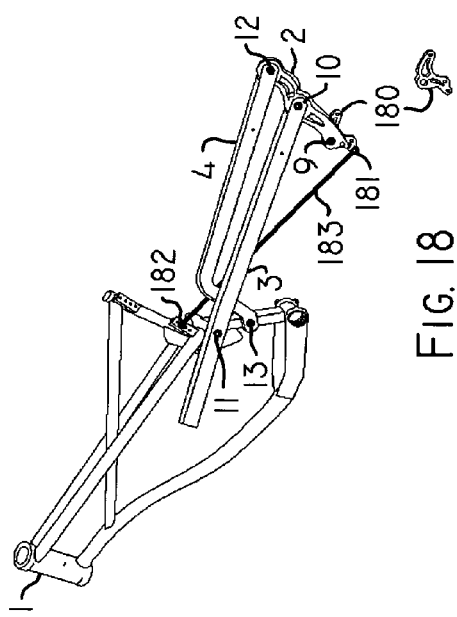
FIG. 19 illustrates a non-cross-linked floating brake configuration between an upper mounting point on the brake mount and a high point on the frame.
Figure 20:
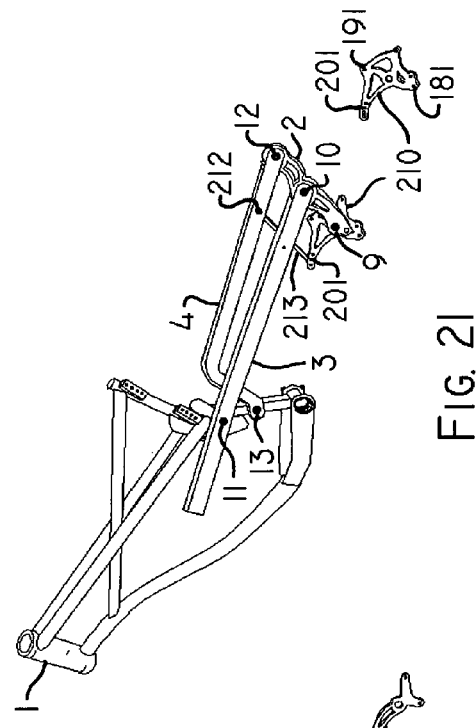
FIG. 20 illustrates a forward mounted link between the brake mount and a trailing arm member.
Figure 21:
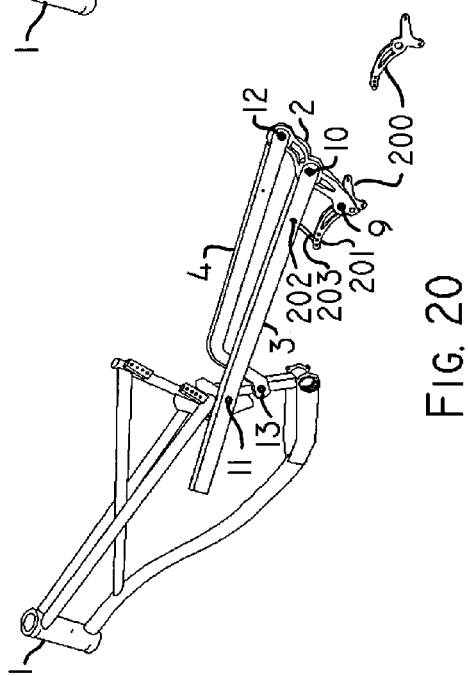
FIG. 21 illustrates a forward mounted link between the brake mount and an alternative trailing arm member.
Figure 23:
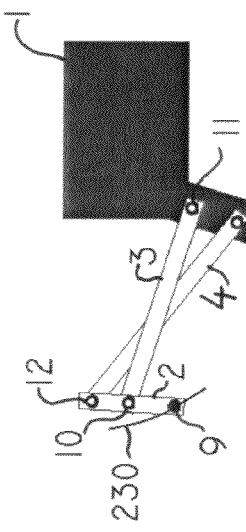
FIG. 23 illustrates a lower mounting point for the proximal pivots.
Figure 22:
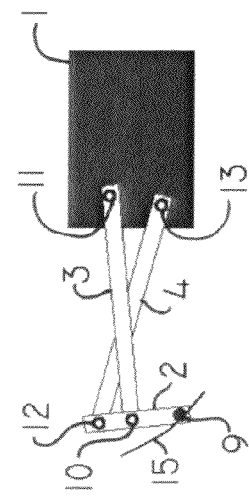
FIG. 22 establishes a visual representation of the optimized form of the invention for purposes of comparison.
Figure 26:
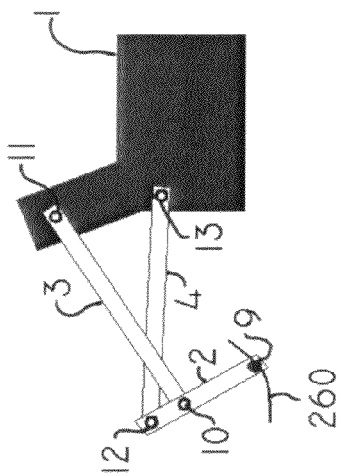
FIG. 26 illustrates a greater ratio of protrusion to trailing arm length.
Figure 25:
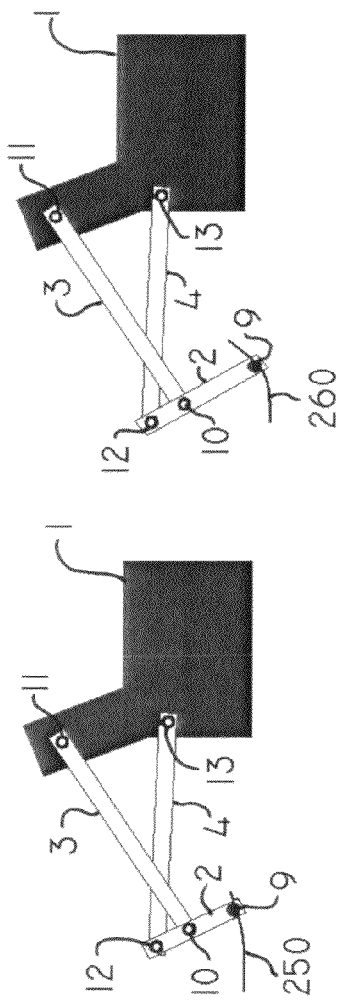
FIG. 25 illustrates a increase in ratio of proximal to distal pivot.
Figure 24:
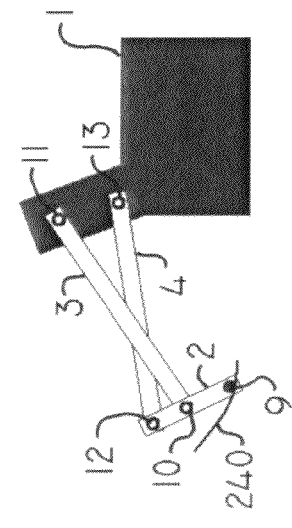
FIG. 24 illustrates a higher mounting point for the proximal pivots.
Figure 27:
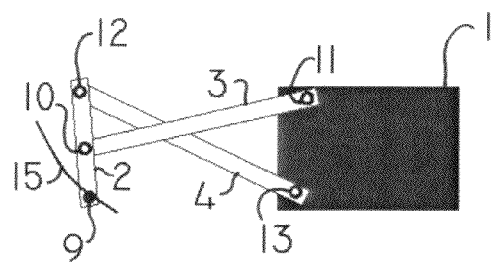
FIG. 27 illustrates a larger structure.
Figure 28:
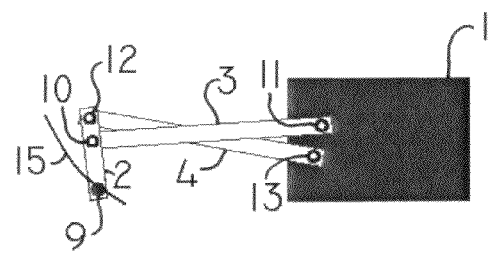
FIG. 28 illustrates a smaller structure.
Figure 29:
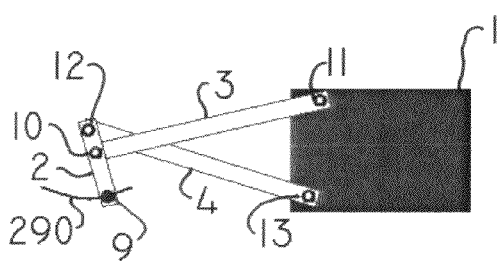
FIG. 29 illustrates an increased ratio of proximal to distal pivot separation.
Figure 30:
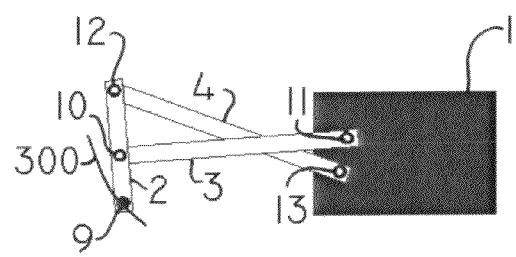
FIG. 30 illustrates a decreased ratio of proximal to distal pivot separation.
Figure 31:
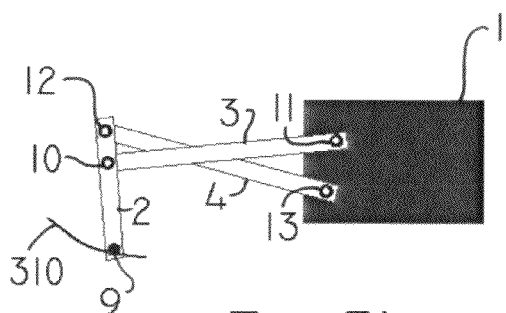
FIG. 31 illustrates an increase in the ratio of protrusion to trailing arm member length.
Figure 32:
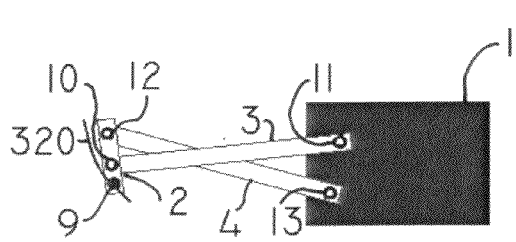
FIG. 32 illustrates a decrease in the ratio of protrusion to trailing arm member length.
Figure 33:
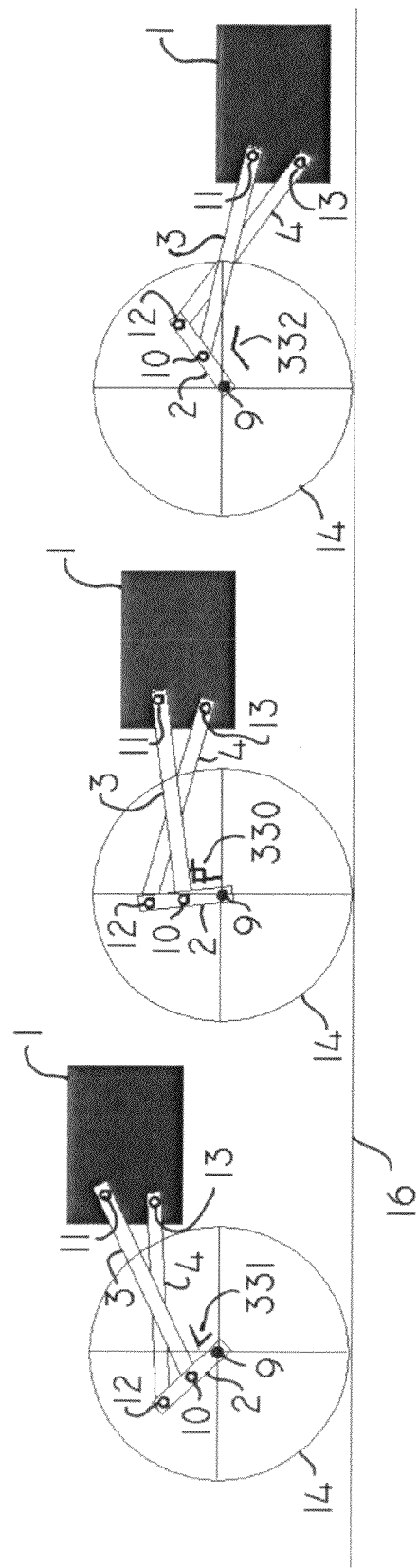
FIG. 33 shows the optimization of the angle between the rearmost member and the mid point trailing arm member.
Figure 36:
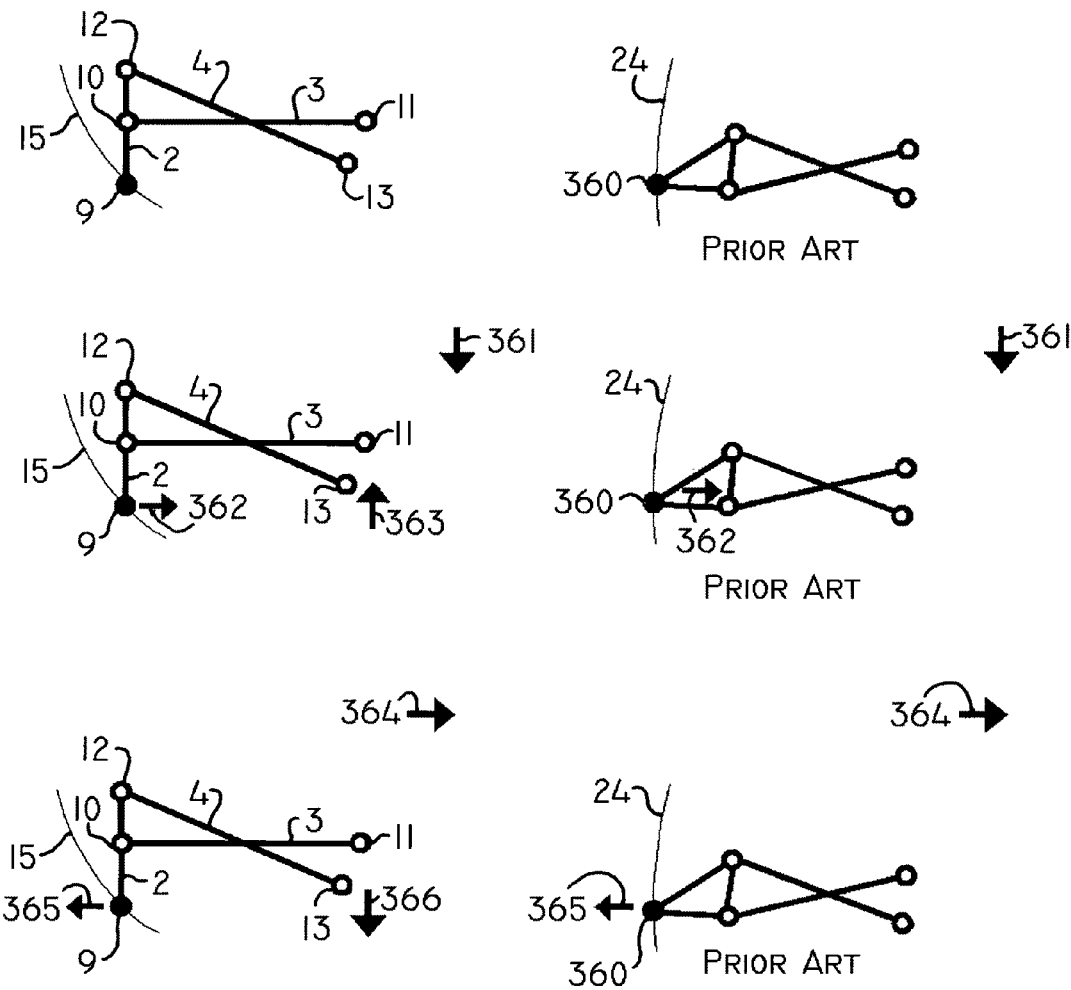
FIG. 36 demonstrates the fundamental differences between this invention and the prior art that shares the closest though partial resemblance.

While the attachment point of the rear brake caliper to the rearmost member 2 would be obvious, to isolate rotational force from the suspension a traditional floating brake may be mounted to this non-traditional linkage at several locations. FIGS. 18-21 show examples of pivotally connected brake mounts about the axle 9 and linked to the frame 1 or to trailing arm members 3 or 4 to offer varying degrees of rotational force isolation. In FIG. 18 we see the mount 180 pivotally attached about the axle 9 and connected at a point 181 through a link 183 to the frame at cross-linked point 183. In FIG. 19 we see demonstration of a mount 190 pivotally connected at a point 191 to a link 193 to an uppermost mounting point 192 on the frame 1. FIGS. 20 and 21 share a configuration at point 201. FIG. 20 shows mount 200 connected between a point on the mount 201 and a point 202 on the trailing member 3 through a short link 203 while FIG. 21 shows mount 210 connected between a point 201 on the mount and a point 212 on a different trailing member 4 using a link 213. From FIG. 21 we see the possibility of producing a hybridized mount 210 that will allow implementation of any of the discussed options.

Configuration of the preferred embodiment can be manipulated through options presented in FIGS. 34 and 35.

The vehicle's wheelbase and the magnitude of the lengthening effect may be configured independently as shown in FIG. 34. In the case where the distal pivotal attachment points 10 & 11 are mounted as shown a long wheelbase is produced.

Mounting distal pivot 10 at point 343 and distal pivot 11 at point 344 produces a short wheelbase option maintaining an optimized angle. An extra long wheelbase may be produced by mounting distal pivot 11 at point 344, keeping distal pivot 10 mounted as shown. This also serves to increase the angle from optimization enhancing the lengthening aspect. An extra short wheelbase is produced by mounting distal pivot 10 at point 343, keeping distal pivot 11 mounted as shown. The angle formed at rearmost member 2 is now less than optimization and enhances the shortening effect of the suspension linkage. The magnitude of the effect is determined by manipulation of the proximal pivot location 13 in the configuration block 8. Mounting pivot 13 at point 340 decreases the proximal 11 & 13 to distal 10 & 12 pivot separation ratio and reduces the effect. Point 341 on the configuration block 8 produces a moderate effect as determined to be optimal for the configuration of the rest of the vehicle's geometry, while mounting point 342 produces an enhanced effect for cases where this may be an advantageous configuration.

A single point of configuration, as shown in FIG. 35, is produced through an enhancement of the configuration block 8. Mounting points 340-342 are much as they were in FIG. 34. The enhancement comes from two more columns of mounting options to produce short wheelbase options in mounting positions 351-352 and long wheelbase options in positions 354-356. The options in this embodiment of the configuration block 8 produce angles of the rearmost member 2 that serve to enhance the shortening effect for the short wheelbase option and enhance the lengthening effect for the long wheelbase option. At any given wheel base option the magnitude of the effect is configurable using any of points 340, 351 or 354 for a reduced effect, points 341, 352 or 355 for the optimized effect and points 353, 342 or 356 for an enhanced effect.

It should be noted that the enhanced configuration block 8 shown in FIG. 35 may be added to the wheelbase configuration options 343 and 344 of FIG. 34 to allow an even wider selection of wheelbase, effect and optimization angle than shown in either of the figures.

The drive tension pulley 6 can be configured to match the effect of the lengthening effect of the suspension. FIG. 34 shows mounting points 345-347. Mounting point 345 corresponds to a reduced effect configuration at point 340 in FIG. 34 or at any of points 340, 351 or 354 shown in FIG. 35. The optimized effect configuration links pulley 6 mounting point 346 with any of points 341, 352 or 355, while the enhanced effect mounting point 347 is mated to any of points 342, 353 or 356.

Following the above discussion and demonstrations, FIG. 37 shows a proposed prototype for the preferred embodiment of the invention as applied to a DH Bike. Trailing arm 4 is shown as curved to allow clearance of the drive chain. The introduction of a chain guide tube 370 is used to prevent rub between the chain and the cross-linked trailing arm member 4. Approximate dimensions between pivot and mounting points are as follows: pivots 10-11 on trailing arm 3, 475 mm, pivots 12-13 on trailing arm 4, 495 mm, pivot 10 to axle 9, 120 mm, pivots 10-12 on rearmost member 2 93 mm, Distance between pivots 11-13 as mounted on the frame is selectable from one of 80, 93 or 116 mm. While it is prudent to view all of these values as approximations with a variation of +/−25%, it should be observed that certain physical limitations constrain the acceptable variation. By way of an example, consider that the current standard for such a vehicle is to have a wheel and tire combination 14 that has a radius in and about the range of 310-350 mm, to claim an acceptable variation of the distance between pivots 10 and 13 to +/−25% would give a distance between pivots 10 and 13 as low as 356 mm, possibly resulting in contact between the tire and the vehicle frame at full extension. Other considerations for optimized geometry come in the form of the size of common disc brake rotors being at or about a 203 mm diameter. By keeping the distance between pivot 10 and axle 9 greater than 102 mm we reduce the amount of interference between the pivot 10 and the rear brake rotor.

Figure 38:
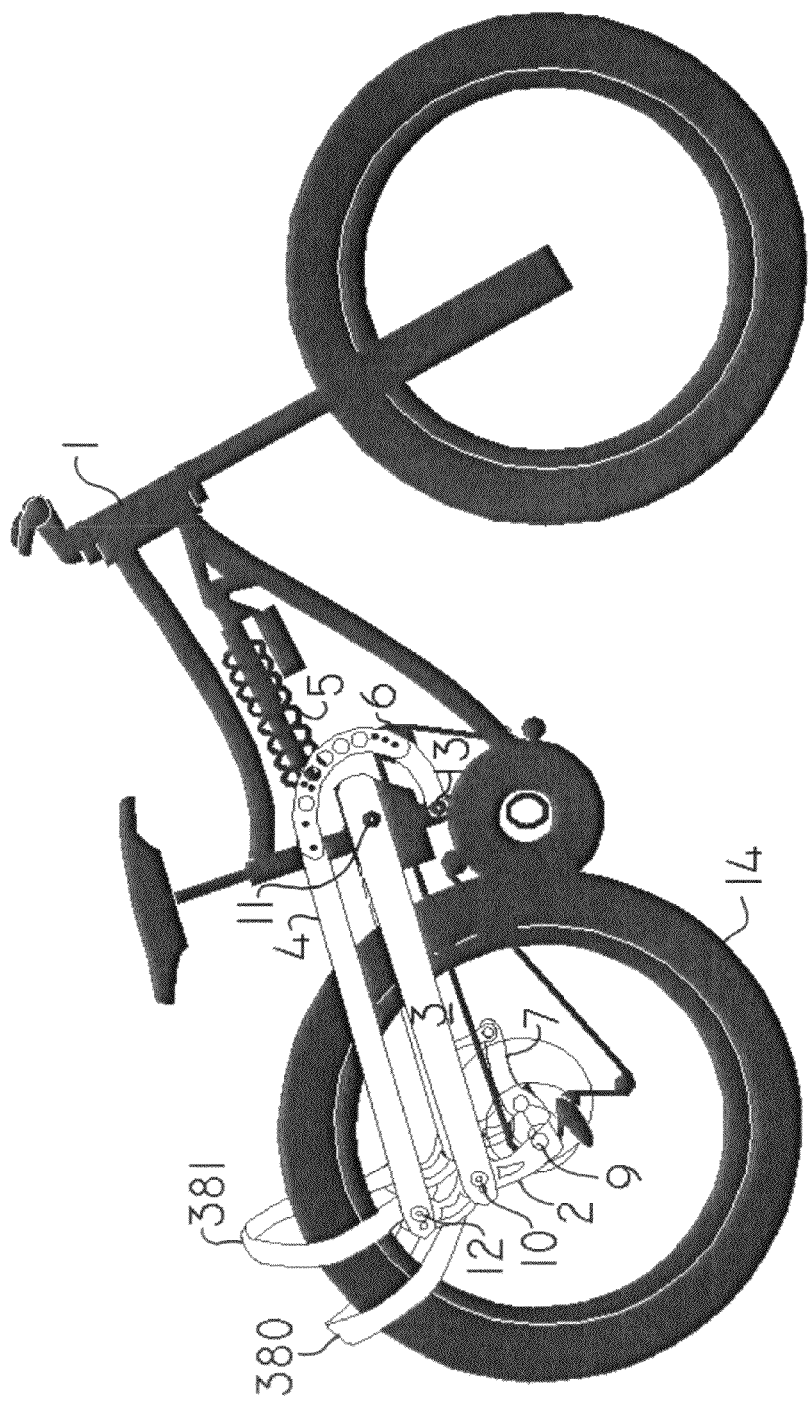
FIG. 38 illustrates an alternative prototype configuration along with the possibility of cross bracing linkage members.

In FIG. 38 another variation of the preferred embodiment is presented showing the addition of optional cross braces 380 and 381 to stiffen the trailing arm members 4 or the rearmost member 2 respectively.

Figure 39:
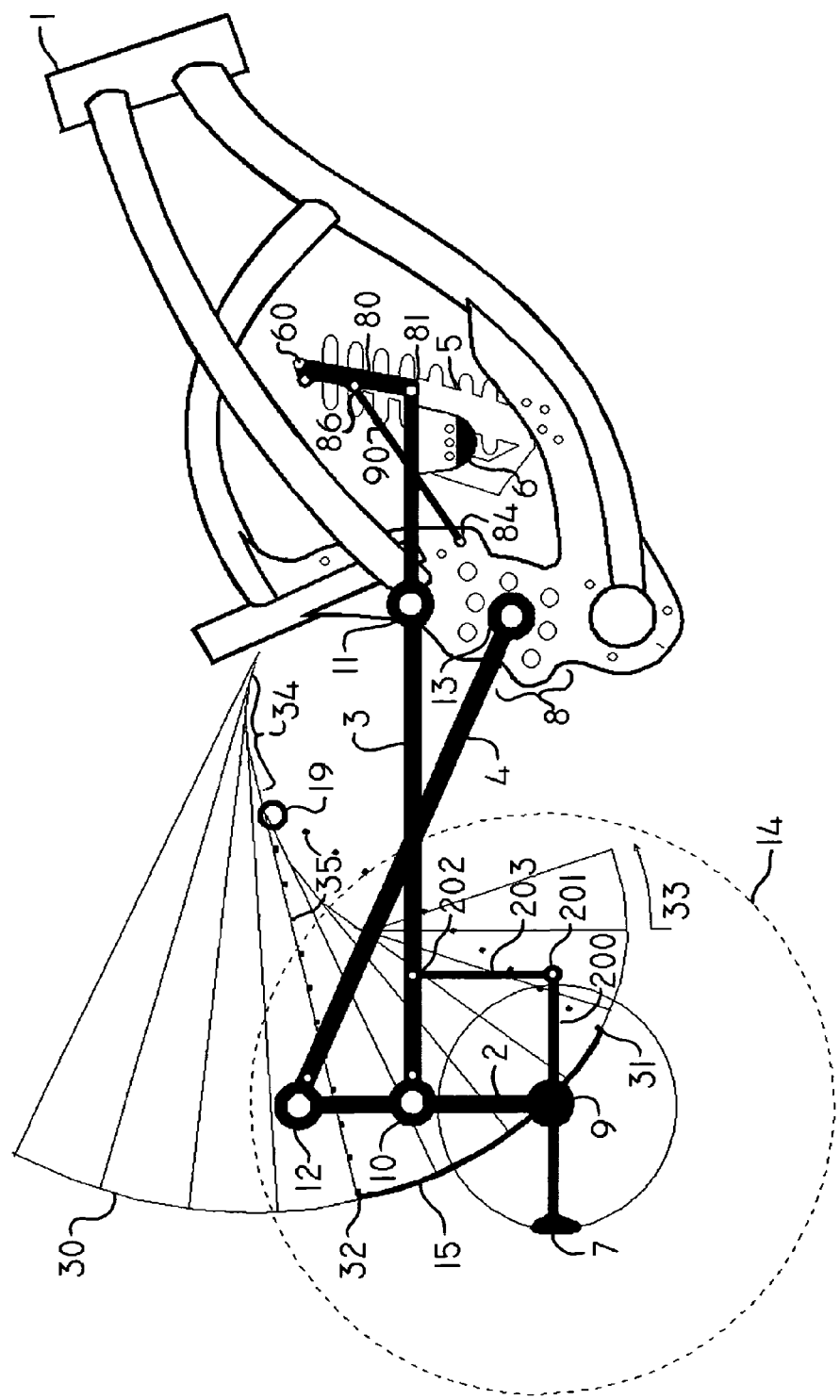
FIG. 39 is a superposition of the primary features and functions of the invention from the figures listed above.

A graphic summary of the definitive characteristics of the invention in terms of linkage, wheel path and configuration is shown in FIG. 39. While each aspect shown has already been individually addressed, this figure serves as a simplified superposition of the concepts demonstrated.

Given the detail of the preferred embodiment, the description and sketches contained within this document, variations, equivalents or alternate implementations will be apparent to those of ordinary skill in the art. It is therefore understood that invention is not limited to the forms shown or described within. The scope of the invention is limited only by the appended claims.

What is claimed is:

1. A vehicle comprising a middle frame section where an operator is supported to which is attached a front contact member and a drive mechanism to power the vehicle and to which is attached a rear suspension linkage comprising at least one rearmost contact mounting point member extending vertically from a contact mounting point at a wheel's axle at the lower most point of the at least one member, at least one trailing arm suspension member with a distal end pivotally connected to a location approximately mid way along the at least one rearmost contact mounting point member and with a proximal end attached to a pivot point on the vehicle middle frame section near the vertical mid height of the vehicle's frame section, this linkage also comprising at least another trailing arm suspension member pivotally connected at a distal end to a location at the top of the rearmost contact mounting point member and pivotally connected to the vehicle's frame section and at a proximal end to a point that crosses and mounts below the proximal end of the other trailing arm suspension member and to which is attached a spring and shock absorber unit mounted to the at least one trailing arm suspension member and to either the frame section or to the other suspension member or members.

2. In the case that the vehicle of claim 1 is a bicycle, the drive mechanism of claim 1 comprises pedals attached to a crank mounted to a frame which drives the rear wheel by chain connecting at least one chain ring attached to the crank and at least one cog attached to the rear wheel with the portion of the chain under drive tension routed over a pulley connected to an extension forward of the proximal pivot of the at least one trailing arm member of claim 1.

3. In the case that the vehicle of claim 1 is a bicycle, a rear brake is mounted to a bracket pivoting about the rear axle.

* * * * *